United States Patent
Schlottau et al.

(10) Patent No.: US 12,498,563 B2
(45) Date of Patent: Dec. 16, 2025

(54) OPTICAL SYSTEMS HAVING EDGE-COUPLED MEDIA LAYERS

(71) Applicant: Apple Inc., Cupertino, CA (US)

(72) Inventors: Friso Schlottau, Mead, CO (US);
Byron R. Cocilovo, Boulder, CO (US);
Jonathan B. Pfeiffer, Lafayette, CO (US)

(*) Notice: Subject to any disclaimer, the term of this patent is extended or adjusted under 35 U.S.C. 154(b) by 419 days.

(21) Appl. No.: 18/153,901

(22) Filed: Jan. 12, 2023

(65) Prior Publication Data

US 2023/0314796 A1    Oct. 5, 2023

Related U.S. Application Data

(63) Continuation of application No. PCT/US2021/042635, filed on Jul. 21, 2021.

(60) Provisional application No. 63/055,791, filed on Jul. 23, 2020.

(51) Int. Cl.
*G02B 27/00* (2006.01)
*F21V 8/00* (2006.01)
*G02B 27/01* (2006.01)

(52) U.S. Cl.
CPC ....... *G02B 27/0081* (2013.01); *G02B 6/0016* (2013.01); *G02B 27/0172* (2013.01); *G02B 2027/0174* (2013.01); *G02B 2207/123* (2013.01)

(58) Field of Classification Search
CPC ............ G02B 27/0081; G02B 27/0172; G02B 6/0016; G02B 2027/0174; G02B 2027/0123; G02B 2207/123
See application file for complete search history.

(56) References Cited

U.S. PATENT DOCUMENTS

| | | | |
|---|---|---|---|
| 2012/0086949 A1* | 4/2012 | Gao | G02B 26/001 359/566 |
| 2013/0063969 A1* | 3/2013 | Neugebauer | G02B 6/0036 362/603 |
| 2013/0147685 A1* | 6/2013 | Gupta | G02B 5/02 362/609 |
| 2018/0149791 A1* | 5/2018 | Urness | G02B 27/4272 |
| 2018/0252869 A1 | 9/2018 | Ayres et al. | |
| 2018/0275350 A1* | 9/2018 | Oh | G02B 6/0076 |
| 2019/0212557 A1* | 7/2019 | Waldern | G02B 6/005 |
| 2020/0192101 A1 | 6/2020 | Ayres et al. | |

* cited by examiner

*Primary Examiner* — Christopher E Leiby
(74) *Attorney, Agent, or Firm* — Treyz Law Group, P.C.; Michael H. Lyons; Jinie M. Guihan

(57) ABSTRACT

The display may include a waveguide that directs light towards an eye box. The waveguide may include first and second media layers that are edge-coupled at an interface. The first media layer may include a louvered mirror cross-coupler that redirects the light towards the second media layer. The second media layer may include a volume hologram output coupler that couples the light out of the waveguide. Additional layers may be interposed between the first media layer and waveguide substrates. The additional layers may help confine the light within the first media layer as the light propagates such that all of the light enters the second media layer through the interface. This may configure the waveguide to occupy a minimal amount of space within the display while also providing the eye box with as bright and uniform an image as possible.

18 Claims, 6 Drawing Sheets

OPTICAL SYSTEMS HAVING EDGE-COUPLED MEDIA LAYERS

This application is a continuation of international patent application No. PCT/US2021/042635, filed Jul. 21, 2021, which claims priority to U.S. provisional patent application No. 63/055,791, filed Jul. 23, 2020, which are hereby incorporated by reference herein in their entireties.

BACKGROUND

This relates generally to optical systems and, more particularly, to optical systems for displays.

Electronic devices may include displays that present images close to a user's eyes. For example, devices such as virtual reality and augmented reality headsets may include displays with optical elements that allow users to view the displays.

It can be challenging to design devices such as these. If care is not taken, the components used in displaying content may be unsightly and bulky and may not exhibit desired levels of optical performance.

SUMMARY

An electronic device such as a head-mounted device may have one or more near-eye displays that produce images for a user. The head-mounted device may be a pair of virtual reality glasses or may be an augmented reality headset that allows a viewer to view both computer-generated images and real-world objects in the viewer's surrounding environment.

The display may include a display module that produces image light to be provided to an eye box. An optical waveguide may direct the image light from the display module towards the eye box. The optical waveguide may include first and second waveguide substrates. First and second media layers may be interposed between the first and second waveguide substrates. The second media layer may be edge-coupled to the first media layer at an interface. An input coupler such as an input coupling prism may couple the image light into the first media layer through the first waveguide substrate. The first media layer may propagate the image light via total internal reflection.

A cross-coupler in the first media layer may redirect the image light towards the second media layer as the image light propagates through the first media layer. A first layer may be interposed between the first waveguide substrate and the first media layer. A second layer may be interposed between the second waveguide substrate and the first media layer. The first and second layers may be dielectric layers such as layers of optically clear adhesive. The first and second layers may have an index of refraction that is different than that of the first media layer. In another suitable arrangement, the first and second layers may be reflective coatings. The first and second layers may serve to confine the image light within the first media layer as the image light propagates along the first media layer, such that all of the image light passes into the second media layer through the interface between the first and second media layers. An output coupler in the second media layer may couple the image light out of the waveguide and towards the eye box. The cross coupler may include a louvered mirror embedded in the first media layer. The output coupler may include volume holograms recorded in the second media layer. When configured in this way, the waveguide may occupy a minimal amount of space within the display while also providing the eye box with as bright and uniform an image as possible.

DETAILED DESCRIPTION

Figure 1:
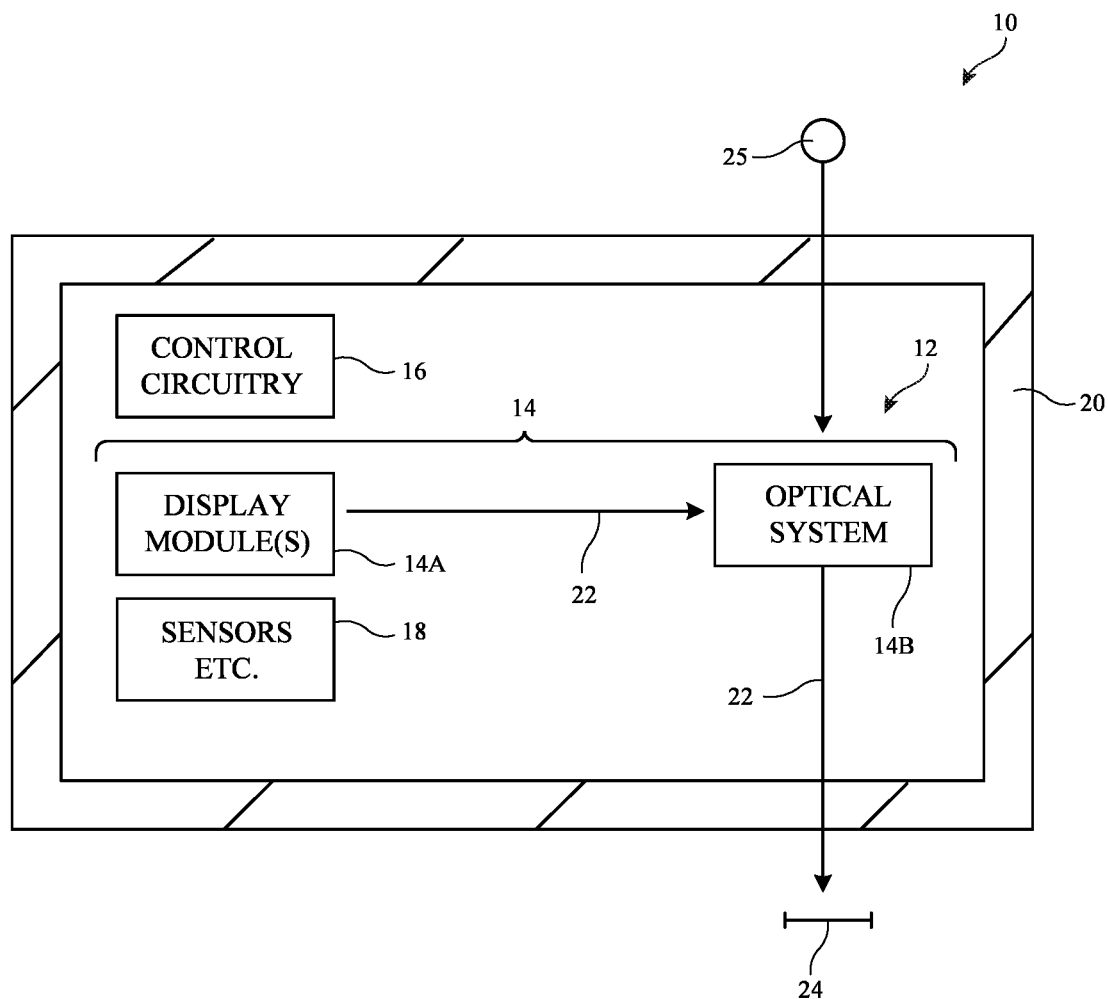
FIG. 1 is a diagram of an illustrative system having a display in accordance with some embodiments.

An illustrative system having a device with one or more near-eye display systems is shown in FIG. 1. System 10 may be a head-mounted device having one or more displays such as near-eye displays 14 mounted within support structure (housing) 20. Support structure 20 may have the shape of a pair of eyeglasses (e.g., supporting frames), may form a housing having a helmet shape, or may have other configurations to help in mounting and securing the components of near-eye displays 14 on the head or near the eye of a user. Near-eye displays 14 may include one or more display modules such as display modules 14A and one or more optical systems such as optical systems 14B. Display modules 14A may be mounted in a support structure such as support structure 20. Each display module 14A may emit light 22 (image light) that is redirected towards a user's eyes at eye box 24 using an associated one of optical systems 14B.

The operation of system 10 may be controlled using control circuitry 16. Control circuitry 16 may include storage and processing circuitry for controlling the operation of system 10. Circuitry 16 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 16 may be based on one or more microprocessors, microcontrollers, digital signal processors, baseband processors, power management units, audio chips, graphics processing units, application specific integrated circuits, and other integrated circuits. Software code (instructions) may be stored on storage in circuitry 16 and run on processing circuitry in circuitry 16 to implement operations for system 10 (e.g., data gathering operations, operations involving the adjustment of components using control signals, image rendering operations to produce image content to be displayed for a user, etc.).

System 10 may include input-output circuitry such as input-output devices 12. Input-output devices 12 may be used to allow data to be received by system 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which system 10 (e.g., head-mounted device 10) is operating. Output components in devices 12 may allow system 10 to provide a user with output and may be used to communicate with external electrical equipment. Input-output devices 12 may include sensors and other components 18 (e.g., image sensors for gathering images of real-world object that are digitally merged with virtual objects on a display in system 10, accelerometers, depth sensors, light sensors, haptic output devices, speakers, batteries, wireless communications circuits for communicating between system 10 and external electronic equipment, etc.). In one suitable arrangement that is sometimes described herein as an example, components 18 may include gaze tracking sensors that gather gaze image data from a user's eye at eye box 24 to track the direction of the user's gaze in real time.

Display modules 14A may include reflective displays (e.g., liquid crystal on silicon (LCOS) displays, digital-micromirror device (DMD) displays, or other spatial light modulators), emissive displays (e.g., micro-light-emitting diode (uLED) displays, organic light-emitting diode (OLED) displays, laser-based displays, etc.), or displays of other types. Light sources in display modules 14A may include uLEDs, OLEDs, LEDs, lasers, combinations of these, or any other desired light-emitting components.

Optical systems 14B may form lenses that allow a viewer (see, e.g., a viewer's eyes at eye box 24) to view images on display(s) 14. There may be two optical systems 14B (e.g., for forming left and right lenses) associated with respective left and right eyes of the user. A single display 14 may produce images for both eyes or a pair of displays 14 may be used to display images. In configurations with multiple displays (e.g., left and right eye displays), the focal length and positions of the lenses formed by components in optical system 14B may be selected so that any gap present between the displays will not be visible to a user (e.g., so that the images of the left and right displays overlap or merge seamlessly).

If desired, optical system 14B may contain components (e.g., an optical combiner, etc.) to allow real-world image light from real-world images or objects 25 to be combined optically with virtual (computer-generated) images such as virtual images in image light 22. In this type of system, which is sometimes referred to as an augmented reality system, a user of system 10 may view both real-world content and computer-generated content that is overlaid on top of the real-world content. Camera-based augmented reality systems may also be used in device 10 (e.g., in an arrangement which a camera captures real-world images of object 25 and this content is digitally merged with virtual content at optical system 14B).

System 10 may, if desired, include wireless circuitry and/or other circuitry to support communications with a computer or other external equipment (e.g., a computer that supplies display 14 with image content). During operation, control circuitry 16 may supply image content to display 14. The content may be remotely received (e.g., from a computer or other content source coupled to system 10) and/or may be generated by control circuitry 16 (e.g., text, other computer-generated content, etc.). The content that is supplied to display 14 by control circuitry 16 may be viewed by a viewer at eye box 24.

Figure 2:
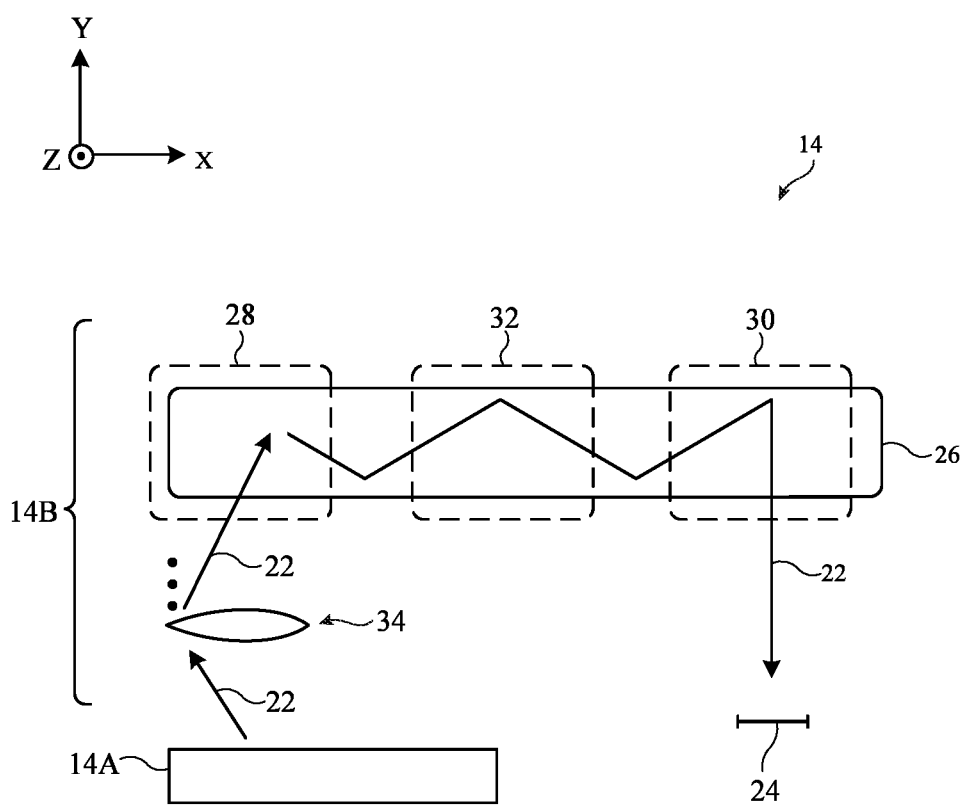
FIG. 2 is a top view of an illustrative optical system for a display having a waveguide with an input coupler, a cross coupler, and an output coupler in accordance with some embodiments.

FIG. 2 is a top view of an illustrative display 14 that may be used in system 10 of FIG. 1. As shown in FIG. 2, near-eye display 14 may include one or more display modules such as display module 14A and an optical system such as optical system 14B. Optical system 14B may include optical elements such as one or more waveguides 26. Waveguide 26 may include one or more stacked substrates (e.g., stacked planar and/or curved layers sometimes referred to herein as waveguide substrates) of optically transparent material such as plastic, polymer, glass, etc.

If desired, waveguide 26 may also include one or more layers of holographic recording media (sometimes referred to herein as holographic media, grating media, or diffraction grating media) on which one or more diffractive gratings are recorded (e.g., holographic phase gratings, sometimes referred to herein as holograms). A holographic recording may be stored as an optical interference pattern (e.g., alternating regions of different indices of refraction) within a photosensitive optical material such as the holographic media. The optical interference pattern may create a holographic phase grating that, when illuminated with a given light source, diffracts light to create a three-dimensional reconstruction of the holographic recording. The holographic phase grating may be a non-switchable diffractive grating that is encoded with a permanent interference pattern or may be a switchable diffractive grating in which the diffracted light can be modulated by controlling an electric field applied to the holographic recording media (medium). Multiple holographic phase gratings (holograms) may be recorded within (e.g., superimposed within) the same volume of holographic media if desired. The holographic phase gratings may be, for example, volume holograms or thin-film holograms in the grating media (medium). The grating media may include photopolymers, gelatin such as dichromated gelatin, silver halides, holographic polymer dispersed liquid crystal, or other suitable holographic media.

Diffractive gratings on waveguide 26 may include holographic phase gratings such as volume holograms or thin-film holograms, meta-gratings, or any other desired diffractive grating structures. The diffractive gratings on waveguide 26 may also include surface relief gratings formed on one or more surfaces of the substrates in waveguides 26, gratings formed from patterns of metal structures, etc. The diffractive gratings may, for example, include multiple multiplexed gratings (e.g., holograms) that at least partially overlap within the same volume of grating medium (e.g., for diffracting different colors of light and/or light from a range of different input angles at one or more corresponding output angles) or overlapping gratings that are formed in respective layers of grating media. If desired, louvered mirrors (also referred to as "louvred" mirrors) such as louvered partially reflective (e.g., metallic) coatings may be formed in the grating media for redirecting image light 22 (e.g., as a part of cross-coupler 32 and/or output coupler 30).

Optical system 14B may include collimating optics such as imaging optics 34. Imaging optics 34 (sometimes referred to herein as imaging lens 34) may include one or more lens elements that help direct image light 22 towards waveguide 26. If desired, display module 14A may be mounted within support structure 20 of FIG. 1 while optical system 14B may be mounted between portions of support structure 20 (e.g., to form a lens that aligns with eye box 24). Other mounting arrangements may be used, if desired.

As shown in FIG. 2, display module 14A may generate image light 22 associated with image content to be displayed to eye box 24. Image light 22 may be collimated using a lens such as a lens in imaging optics 34. Optical system 14B may be used to present image light 22 output from display module 14A to eye box 24.

Optical system 14B may include one or more optical couplers such as input coupler 28, cross-coupler 32, and output coupler 30. In the example of FIG. 2, input coupler 28, cross-coupler 32, and output coupler 30 are formed at or on waveguide 26. Input coupler 28, cross-coupler 32, and/or output coupler 30 may be completely embedded within the substrate layers of waveguide 26, may be partially embedded within the substrate layers of waveguide 26, may be mounted to waveguide 26 (e.g., mounted to an exterior surface of waveguide 26), etc.

The example of FIG. 2 is merely illustrative. One or more of these couplers (e.g., cross-coupler 32) may be omitted. Optical system 14B may include multiple waveguides that are laterally and/or vertically stacked with respect to each other. Each waveguide may include one, two, all, or none of couplers 28, 32, and 30. Waveguide 26 may be at least partially curved or bent if desired.

Waveguide 26 may guide image light 22 down its length via total internal reflection. Input coupler 28 may be configured to couple image light 22 from display module 14A (imaging optics 34) into waveguide 26, whereas output coupler 30 may be configured to couple image light 22 from within waveguide 26 to the exterior of waveguide 26 and towards eye box 24. For example, display module 14A may emit image light 22 in the +Y direction towards optical system 14B. When image light 22 strikes input coupler 28, input coupler 28 may redirect image light 22 so that the image light propagates within waveguide 26 via total internal reflection towards output coupler 30 (e.g., in the +X direction). When image light 22 strikes output coupler 30, output coupler 30 may redirect image light 22 out of waveguide 26 towards eye box 24 (e.g., back in the −Y direction). In scenarios where cross-coupler 32 is formed at waveguide 26, cross-coupler 32 may redirect image light 22 in one or more directions and/or may expand image light 22 as the image light propagates down the length of waveguide 26, for example. Output coupler 30 may additionally or alternatively expand the image light if desired.

Input coupler 28, cross-coupler 32, and/or output coupler 30 may be based on reflective optics, refractive optics, and/or diffractive (e.g., holographic) optics. In arrangements where couplers 28, 30, and 32 are formed from reflective and refractive optics, couplers 28, 30, and 32 may include one or more reflectors (e.g., louvered mirrors, an array of micromirrors, partial mirrors, or other reflectors). In arrangements where couplers 28, 30, and 32 are based on diffractive optics, couplers 28, 30, and 32 may include diffractive gratings (e.g., volume holograms, surface relief gratings, etc.). In other words, any combination of diffractive, reflective, and/or refractive optics may be used for forming input coupler 28, cross-coupler 32, and output coupler 30. As one example, cross-coupler 32 may be formed from a surface relief grating whereas output coupler 30 is formed from a louvered mirror or volume holograms. As another example, input coupler 28 may include a prism mounted to a surface of waveguide 26, cross-coupler 32 may include a louvered mirror embedded in a first media layer of waveguide 26, and output coupler 30 may include diffractive grating structures such as volume holograms recorded in a second media layer of waveguide 26 (e.g., a layer of holographic recording medium).

Figure 3:
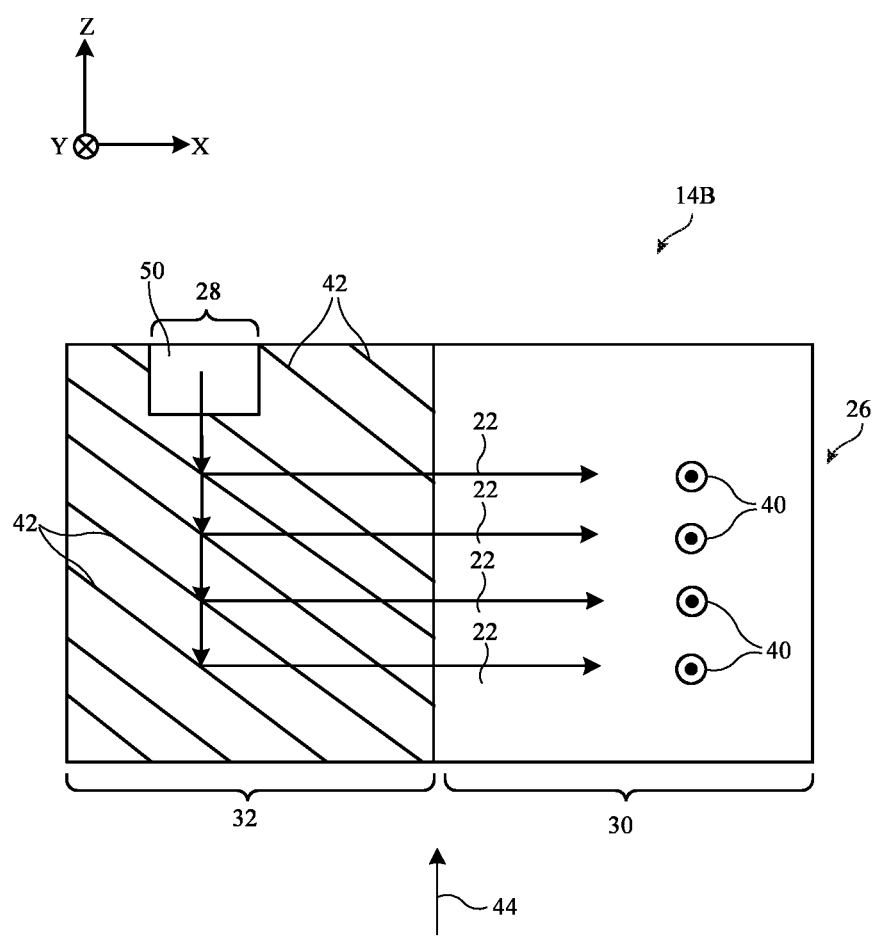
FIG. 3 is a front view of an illustrative waveguide having a louvered mirror cross coupler and a holographic output coupler in accordance with some embodiments.

FIG. 3 is a front view of waveguide 26 showing how input coupler 28 may include a prism mounted to a surface of waveguide 26, cross-coupler 32 may include a louvered mirror, and output coupler 30 may include diffractive grating structures such as volume holograms. As shown in FIG. 3, input coupler 28 may include an input coupling prism such as input coupling prism 50. Input coupling prism 50 may be mounted to a lateral surface of waveguide 26.

Image light 22 may follow an optical path from display module 14A to eye box 24 (FIG. 2). Input coupler 28, cross-coupler 32, and output coupler 30 may be interposed on the optical path. Cross-coupler 32 may be interposed on the optical path between input coupler 28 and output coupler 30. Output coupler 30 may be interposed on the optical path between cross-coupler 32 and the eye box.

Input coupling prism 50 may receive image light 22 (e.g., in the +Y direction from display module 14A of FIG. 2). Input coupling prism 50 may be a reflective input coupling prism or a transmissive input coupling prism. Examples in which input coupling prism 50 is a transmissive input coupling prism are described herein as an example. Input coupling prism 50 may couple image light 22 into waveguide 26 by redirecting image light 22 in a first direction (e.g., downwards in the +Y direction into waveguide 26 and in the −Z direction). Input coupling prism 50 may couple image light 22 into waveguide 26 at an angle such that the image light propagates along waveguide 26 (e.g., in the −Z direction) via total internal reflection.

As shown in FIG. 3, cross-coupler 32 may include a louvered mirror such as louvered mirror 42 embedded within a first media layer of waveguide 26. Louvered mirror 42 (sometimes referred to herein as partially reflective louver 42) may be formed from partially reflective coatings embedded within the first media layer. Louvered mirror 42 may redirect (reflect) the image light 22 coupled into waveguide 26 in a second direction towards output coupler 30 (e.g., in the +X direction). Image light 22 may continue to propagate via total internal reflection to output coupler 30 after being reflected by louvered mirror 42.

Louvered mirror 42 may, for example, have mirror planes that are oriented at non-parallel angles with respect to both the X and Z axes of FIG. 3. The reflective axis of louvered mirror 42 is oriented perpendicular to the mirror planes. The image light may be incident upon louvered mirror 42 at an incident angle and may reflect off of louvered mirror 42 at a reflection angle. The reflective axis may bisect the incident and reflection angles. The reflective axis may lie within the X-Z plane or, if desired, the reflective axis may also be oriented at a non-zero angle with respect to the X-Z plane. In other words, the reflective axis may be oriented out-of-plane (e.g., may have a positive or negative non-zero out-of-plane component with respect to the X-Z plane) in addition to being oriented at a non-zero angle with respect to the X and Z axes as shown in FIG. 3.

Output coupler 30 may couple the image light 22 from cross-coupler 32 out of waveguide 26 by redirecting the image light back towards the eye box in the direction of arrows 40 (e.g., in the −Y direction). Output coupler 30 may, for example, include a diffractive grating structure recorded in a second media layer. The diffractive grating structure may include volume holograms. The reflective axis of the volume holograms may be oriented at a non-zero angle with respect to the normal surface to the lateral surface of waveguide 26 and/or at a non-zero angle with respect to the X and Z axes, for example. Similarly, the lines of constant refractive index of the holograms (e.g., the fringes of the holograms) may be oriented at a non-zero angle with respect to the X and Z axes. The volume holograms may include multiplexed (overlapping) holograms superimposed in the same volume of the second media layer and/or may include multiple holograms that are at least partially non-overlapping. Multiplexing multiple holograms may allow the diffractive grating structures to diffract image light 22 over a range of incident angles and wavelengths.

Figure 4:
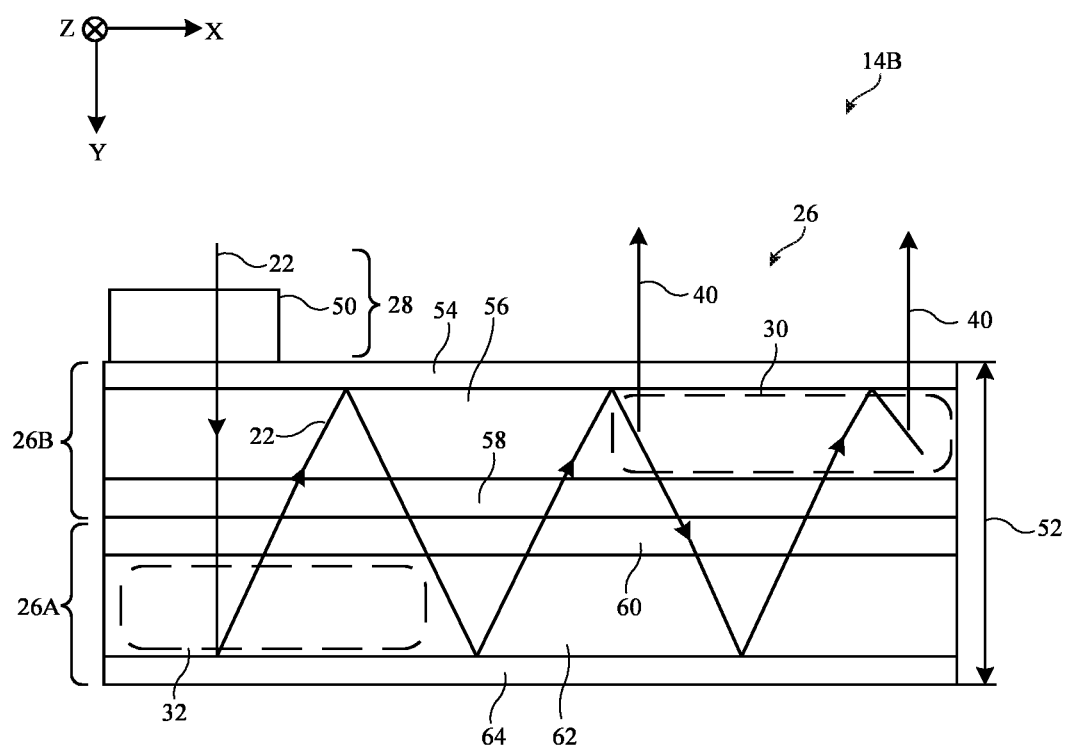
FIG. 4 is a bottom view showing how an illustrative louvered mirror cross coupler and holographic output coupler may be formed in different stacked media layers in accordance with some embodiments.

FIG. 4 is a bottom view of waveguide 26 (e.g., as taken in the direction of arrow 44 of FIG. 3) in an example where the first and second media layers are stacked on top of each other. As shown in FIG. 4, waveguide 26 may include a first waveguide portion 26A that is vertically stacked with respect to a second waveguide portion 26B. In other words, second waveguide portion 26B may be interposed between first waveguide portion 26A and display module 14A (FIG. 2).

First waveguide portion 26A may include the first media layer (e.g., first media layer 62), a first waveguide substrate 64, and a second waveguide substrate 60. First media layer 62 may be interposed (sandwiched) between first waveguide substrate 64 and second waveguide substrate 60. Second waveguide portion 26B may include the second media layer (e.g., second media layer 56), a third waveguide substrate 58 mounted to second waveguide substrate 60, and a fourth waveguide substrate 54. Second media layer 56 may be interposed (sandwiched) between third waveguide substrate 58 and fourth waveguide substrate 54. Cross-coupler 32 (e.g., louvered mirror 42 of FIG. 3) may be embedded within some or all of first media layer 62. Output coupler 30 (e.g., a diffractive grating structure such as volume holograms) may be recorded across some or all of second media layer 56. In the example of FIG. 4, output coupler 30 is non-overlapping with respect to cross-coupler 32. Input coupling prism 50 may be mounted to fourth waveguide substrate 54.

As shown in FIG. 4, input coupling prism 50 may couple image light 22 into waveguide 26. Image light 22 may pass through second waveguide portion 26B to cross-coupler 32. The louvered mirror in cross-coupler 32 (e.g., louvered mirror 42 of FIG. 3) may redirect image light 22 so that the image light propagates through waveguide portions 26A and 26B in the +X direction via total internal reflection. When the image light hits output coupler 30, output coupler 30 may couple the image light out of second waveguide portion 26B and towards the eye box (e.g., in the -Y direction), as shown by arrows 40. Configuring waveguide 26 with stacked waveguide portions 26A and 26B in this way may allow the image light to propagate without ray angle errors. However, configuring waveguide 26 in this way may cause the waveguide to exhibit a relatively large thickness 52, such that the waveguide consumes an excessive amount of volume and weight within system 10. In addition, waveguide 26 of FIG. 4 may exhibit relatively low light uniformity and throughput.

Figure 5:
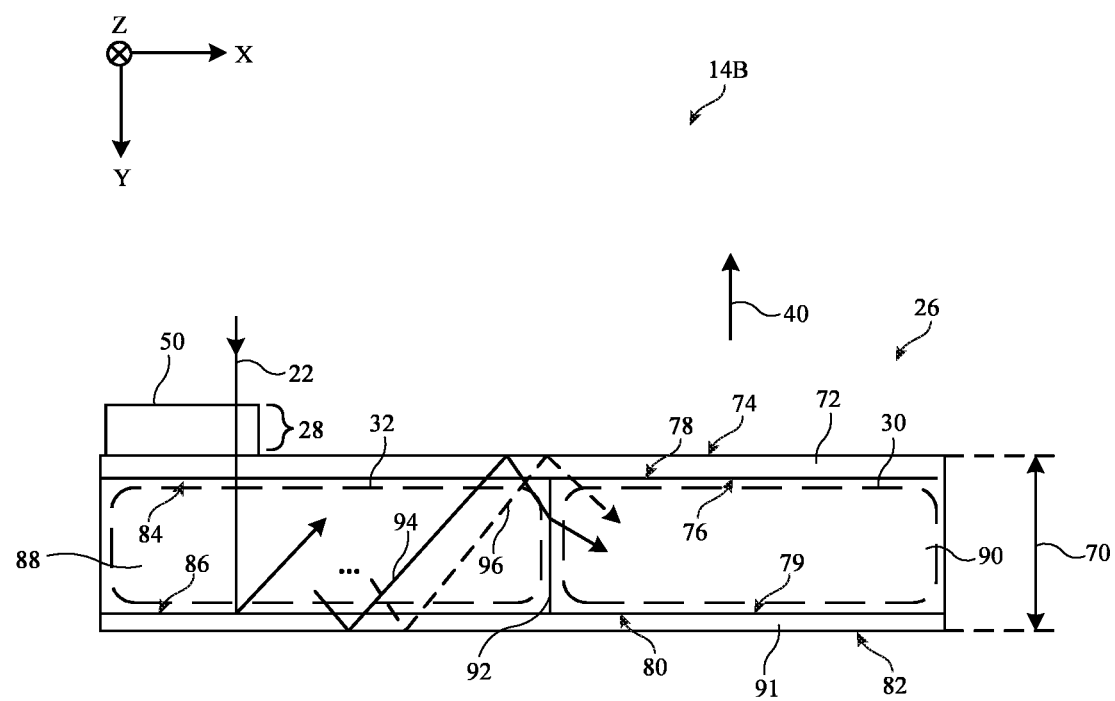
FIG. 5 is a bottom view of an illustrative waveguide having a louvered mirror cross coupler and a holographic output coupler formed in respective edge-coupled media layers in accordance with some embodiments.

In order to mitigate these issues, the first and second media layers may be edge-coupled within waveguide 26. FIG. 5 is a bottom view of waveguide 26 in an example where the first and second media layers are edge-coupled within waveguide 26. As shown in FIG. 5, waveguide 26 may include a first waveguide substrate 72 and a second waveguide substrate 91. Waveguide substrate 72 may be interposed between waveguide substrate 91 and display module 14A (FIG. 2). Waveguide 26 may also include the first media layer (e.g., first media layer 88) and the second media layer (e.g., second media layer 90). First media layer 88 may be a holographic recording medium or any other desired dielectric medium (e.g., a plastic medium, a glass medium, a polymer medium, etc.). Second media layer 90 may be a holographic recording medium. Cross coupler 32 (e.g., louvered mirror 42 of FIG. 3) may be embedded within first media layer 88. Output coupler 30 (e.g., a diffractive grating structure such as volume holograms) may be recorded in second media layer 90.

First waveguide substrate 72 may have a first lateral surface 74 and an opposing second lateral surface 78. Lateral surface 74 may form an exterior lateral surface of waveguide 26. Similarly, second waveguide substrate 91 may have a first lateral surface 80 and an opposing second lateral surface 82. Lateral surface 82 may form an exterior lateral surface of waveguide 26. Lateral surfaces 74, 78, 80, and/or 82 may be planar (as shown in FIG. 5) or may be completely or partially curved. First media layer 88 may have a first lateral surface 84 at first waveguide substrate 72 and an opposing second lateral surface 86 at second waveguide substrate 91. Second media layer 90 may have a first lateral surface 76 at first waveguide substrate 72 and an opposing second lateral surface 79 at second waveguide substrate 91. First waveguide substrate 72 may be layered onto (e.g., lateral surface 78 may be in direct contact with) lateral surface 84 of first media layer 88 and lateral surface 76 of second media layer 90. Second waveguide substrate 91 may be layered onto (e.g., lateral surface 80 may be in direct contact with) lateral surface 86 of first media layer 88 and lateral surface 79 of second media layer 90. First media layer 88 may have peripheral edges that couple the edges of lateral surface 84 to the edges of lateral surface 86. Similarly, second media layer 90 may have peripheral edges that couple the edges of lateral surface 76 to the edges of lateral surface 79.

Rather than being vertically-stacked (e.g., as shown in FIG. 4), first media layer 88 may be edge-coupled (e.g., butt-coupled) to second media layer 90 at interface 92. In other words, a peripheral edge of first media layer 88 may be coupled to (e.g., in direct contact with) a peripheral edge of second media layer 90 at interface 92 (sometimes referred to herein as joint 92, edge-coupling interface 92, edge-coupled joint 92, or butt-coupled joint 92). In this way, lateral surface 84 of first media layer 88 may be coplanar with lateral surface 76 of second media layer 90 and lateral surface 86 of first media layer 88 may be coplanar with lateral surface 79 of second media layer 90. Arranging the first and second media layers in this way may configure waveguide 26 to exhibit a thickness 70 that is substantially less than (e.g., at least 50% less than) thickness 52 of FIG. 4.

As shown in FIG. 5, input coupling prism 50 may couple image light 22 into first media layer 88. Cross-coupler 32 in first media layer 88 (e.g., louvered mirror 42 of FIG. 3) may redirect image light 22 towards output coupler 30 (e.g., in the +X direction). The image light 22 reflected by cross-coupler 32 may propagate down waveguide 26 via total internal reflection. During propagation through first media layer 88, image light 22 may reflect between lateral surface 74 of waveguide substrate 72 and lateral surface 82 of waveguide substrate 91 via total internal reflection. This may cause a first portion of the image light to pass into second media layer 90 through interface 92, as shown by arrow 94, while a second portion of the image light passes into second media layer 90 through waveguide substrate 72 and/or waveguide substrate 91, as shown by arrow 96. Output coupler 30 in second media layer 90 may couple at least some of the image light 22 out of waveguide 26 and towards the eye box (e.g., as shown by arrow 40).

Second media layer 90 may have a different bulk refractive index than first media layer 88. This may cause the portion of the image light that passes through interface 92 (e.g., as shown by arrow 94) to enter second media layer 90 at a different angle than the portion of the image light that passes into second media layer 90 through waveguide substrates 72 and 91 (e.g., as shown by arrow 94). This difference in angle for the image light upon entry to second media layer 90 may lead to undesirable light loss and non-uniformity in the image light that reaches eye box 24.

Figure 6:
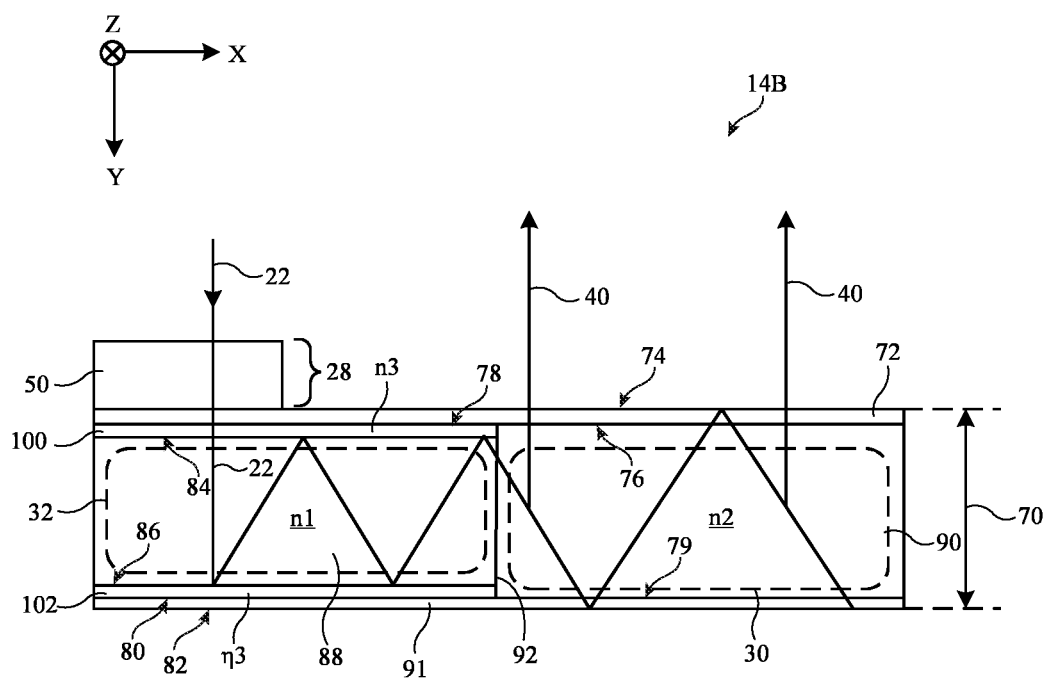
FIG. 6 is a bottom view of an illustrative waveguide having a louvered mirror cross coupler formed in a first media layer, a holographic output coupler formed in a second media layer edge-coupled to the first media layer, and optically clear adhesive that mitigates light loss at the interface between the first and second media layers in accordance with some embodiments.

In order to mitigate these issues, waveguide 26 may be provided with structures that serve to confine image light 22 within first media layer 88 as the image light propagates through first media layer 88 via total internal reflection. FIG. 6 is a diagram showing how waveguide 26 may be provided with structures that serve to confine image light 22 within first media layer 88 as the image light propagates through first media layer 88.

As shown in FIG. 6, additional layers such as optically clear adhesive layers 100 and 102 may be provided on first media layer 88 to confine image light 22 within first media layer 88 during propagation. Optically clear adhesive layer 100 may be interposed between lateral surface 78 of waveguide substrate 72 and lateral surface 84 of first media layer 88 (e.g., optically clear adhesive layer 100 may layered onto and in direct contact with both lateral surface 78 and lateral surface 84). Optically clear adhesive layer 100 may, if desired, help to adhere waveguide substrate 72 to first media layer 88. Similarly, optically clear adhesive layer 102 may be interposed between lateral surface 80 of waveguide substrate 91 and lateral surface 86 of first media layer 88 (e.g., optically clear adhesive layer 102 may be in direct contact with both lateral surface 86 and lateral surface 80). Optically clear adhesive layer 102 may, if desired, help to adhere waveguide substrate 91 to first media layer 88. First media layer 88 may be interposed between optically clear adhesive layers 100 and 102. Optically clear adhesive layers 100 and 102 may overlap some or all of first media layer 88 (e.g., up to interface 92) without extending beyond interface 92 or overlapping second media layer 90. If desired, second media layer 90 may be formed without optically clear adhesive layers (e.g., lateral surface 76 may directly contact lateral surface 78 of waveguide substrate 72 and lateral surface 79 may directly contact lateral surface 79 of waveguide substrate 91, as shown in FIG. 6).

First media layer 88 may have a first index of refraction n1 (e.g., a bulk index of refraction). Second media layer 90 may have a second bulk index of refraction n2 (e.g., a bulk index of refraction) that is different from (e.g., less than) first index of refraction n1. Optically clear adhesive 100 may have a third index of refraction n3 that is different from (e.g., less than) first index of refraction n1. Third index of refraction n3 may be selected such that the difference between first index of refraction n1 and the third index of refraction n3 is sufficiently large so that image light 22 reflects at the interfaces between optically clear adhesive layers 100 and 102 and first media layer 88 (e.g., the absolute value of the difference between indices of refraction n1 and n3 may be 0.3 or greater, 0.4 or greater, 0.5 or greater, 0.6 or greater, 0.7 or greater, 0.2 or greater, 1.0 or greater, etc.). As one example, first index of refraction n1 may be 2.0, 1.8, between 1.8 and 2.2, between 1.7 and 2.5, greater than 1.7, greater than 1.8, greater than 1.9, greater than 1.6, greater than 2.0, or other values. Second index of refraction n2 may be 1.5, 1.4, between 1.2 and 1.7, or any other values. Third index of refraction n3 may be 1.5, 1.4, 1.6, between 1.4 and 1.6, between 1.3 and 1.7, less than 1.8, less than 1.7, less than 1.6, less than 1.5, less than 1.4, etc.

The presence of optically clear adhesive layers 100 and 102 may establish a sharp refractive index boundary between the optically clear adhesive layers and first media layer 88 (e.g., at lateral surfaces 84 and 86 of first media layer 88). This may cause image light 22 to reflect off of the interfaces between optically clear adhesive layers 100 and 102 and first media layer 88 (e.g., lateral surfaces 84 and 86) without passing into waveguide substrates 72 and 91 as the image light propagates through first media layer 88 via total internal reflection. In other words, optically clear adhesive layer 100 may block image light 22 from passing into waveguide substrate 72 and optically clear adhesive layer 102 may block image light 22 from passing into waveguide substrate 91 as image light 22 propagates along first media layer 88 via total internal reflection. By confining image light 22 within first media layer 88 as the image light propagates through first media layer 88 via total internal reflection, all of the image light may enter second media layer 90 through interface 92, thereby mitigating any loss associated with light passing into second media layer 90 through waveguide substrates 72 and 91 (e.g., as shown by arrow 96 of FIG. 5). Output coupler 30 (e.g., diffractive grating structures such as volume holograms) may then diffract the image light 22 that passed through interface 92 out of waveguide 26 and towards the eye box, as shown by arrows 40. This may serve to provide the eye box with as bright and uniform an image as possible, while also allowing waveguide 26 to exhibit the relatively compact thickness 70.

The example of FIG. 6 is merely illustrative. If desired, optically clear adhesive layers 100 and 102 may be any other desired dielectric layers having refractive index n3 (e.g., optically clear adhesive layers 100 and 102 may be dielectric layers or dielectric coatings that are non-adhesive). In another suitable arrangement, optically clear adhesive layers 100 and 102 may be replaced with reflective layers (e.g., metallic coatings or other coatings) that reflect image light 22 and that thereby serve to confine image light 22 within first media layer 88 during propagation.

In accordance with an embodiment, an optical waveguide is provided that includes first and second waveguide substrates, first and second media layers interposed between the first and second waveguide substrates, the second media layer is edge-coupled to the first media layer and the first media layer is configured to propagate image light via total internal reflection, a louvered mirror in the first media layer and configured to redirect the image light towards the second media layer, volume holograms in the second media layer and configured to couple the image light out of the optical waveguide, a first layer interposed between the first media layer and the first waveguide substrate, and a second layer interposed between the first media layer and the second waveguide substrate, as the image light propagates along the first media layer via total internal reflection, the first layer is configured to block the image light from passing into the first waveguide layer and the second layer is configured to block the image light from passing into the second waveguide layer.

In accordance with another embodiment, the second media layer is edge-coupled to the first media layer at an interface and the image light is configured to pass from the first media layer into the second media layer through the interface.

In accordance with another embodiment, the image light is configured to propagate along the second media layer via total internal reflection.

In accordance with another embodiment, as the image light propagates along the second media layer via total internal reflection, the image light is configured to pass into the first and second waveguide substrates.

In accordance with another embodiment, the first and second layers are dielectric layers.

In accordance with another embodiment, the dielectric layers include optically clear adhesive.

In accordance with another embodiment, the first media layer has a first index of refraction, the second media layer has a bulk index of refraction that is different from the first index of refraction, and the optically clear adhesive has a second index of refraction that is less than the first index of refraction.

In accordance with another embodiment, the first and second layers include reflective coatings.

In accordance with an embodiment, a display system configured to display image light at an eye box, the display system is provided that includes first and second waveguide substrates, first and second media layers interposed between the first and second waveguide substrates, the second media layer is edge-coupled to the first media layer and the first media layer has a first index of refraction, a cross-coupler in the first media layer, the first media layer is configured to propagate the image light via total internal reflection and the cross-coupler is configured to redirect the image light towards the second media layer as the image light propagates through the first media layer, an output coupler in the second media layer and configured to couple the image light out of the second media layer and towards the eye box, a first dielectric layer interposed between the first media layer and the first waveguide substrate, and a second dielectric layer interposed between the first media layer and the second waveguide substrate, the first and second dielectric layers have a second index of refraction that is different from the first index of refraction.

In accordance with another embodiment, the first media layer has a first lateral surface coupled to the first dielectric layer, the first media layer has a second lateral surface that opposes the first lateral surface and that is coupled to the second dielectric layer, and the first and second lateral surfaces are configured to reflect the image light as the image light propagates through the first media layer.

In accordance with another embodiment, the second media layer is edge-coupled to the first media layer at an interface and the image light passes from the first media layer into the second media layer through the interface.

In accordance with another embodiment, the first dielectric layer includes optically clear adhesive.

In accordance with another embodiment, the second dielectric layer includes optically clear adhesive.

In accordance with another embodiment, the first index of refraction is greater than or equal to 1.6 and the second index of refraction is less than or equal to 1.6.

In accordance with another embodiment, the cross-coupler includes a louvered mirror embedded in the first media layer.

In accordance with another embodiment, the output coupler includes volume holograms in the second media layer.

In accordance with another embodiment, the cross-coupler includes a louvered mirror embedded in the first media layer.

In accordance with another embodiment, the second media layer has a bulk index of refraction that is less than the first index of refraction.

In accordance with another embodiment, the display system includes an input coupling prism mounted to the first waveguide substrate and configured to couple the image light into the first media layer.

In accordance with an embodiment, a display system is provided that includes a first media layer having opposing first and second lateral surfaces, a second media layer that is edge-coupled to the first media layer at an interface, a first layer of optically clear adhesive layered onto the first media layer, a second layer of optically clear adhesive layered onto the second media layer, an input coupler configured to couple image light into the first media layer, first media layer is configured to propagate the image light via total internal reflection, the first and second layers of optically clear adhesive are configured to confine the image light within the first media layer as the image light propagates through the first media layer via total internal reflection, the image light is configured to pass from the first media layer into the second media layer through the interface, and the second media layer is configured to propagate the image light via total internal reflection after the image light has passed through the interface, a cross-coupler in the first media layer and configured to redirect the image light towards the second media layer as the image light propagates through the first media layer via total internal reflection, and an output coupler in the second media layer and configured to redirect the image light towards an eye box as the image light propagates through the second media layer via total internal reflection.

In accordance with another embodiment, the input coupler includes a prism, the cross-coupler includes a louvered mirror embedded in the first media layer, and the output layer includes volume holograms recorded in the second media layer.

In accordance with another embodiment, the display system includes a first waveguide substrate that directly contacts the first layer of optically clear adhesive and a first lateral surface of the second media layer, and a second waveguide substrate that directly contacts the second layer of optically clear adhesive and a second lateral surface of the second media layer.

In accordance with another embodiment, the first and second layers of optically clear adhesive have a different refractive index than the first media layer.

The foregoing is merely illustrative and various modifications can be made to the described embodiments. The foregoing embodiments may be implemented individually or in any combination.

What is claimed is:
1. An optical waveguide comprising:
   first and second waveguide substrates;
   first and second media layers interposed between the first and second waveguide substrates, wherein the second media layer is edge-coupled to the first media layer, wherein the second media layer is in direct contact with the first media layer, and wherein the first media layer is configured to propagate image light via total internal reflection;
   an input coupler on the first waveguide substrate and configured to couple the image light into the first media layer, wherein the image light coupled into the first media layer is configured to propagate along the second media layer via total internal reflection and wherein, as the image light coupled into the first media layer propagates along the second media layer via total internal reflection, the image light coupled into the first media layer is configured to pass into the first waveguide substrate;

a louvered mirror in the first media layer and configured to redirect the image light towards the second media layer;

volume holograms in the second media layer and configured to couple the image light out of the optical waveguide;

a first layer interposed between the first media layer and the first waveguide substrate;

a second layer interposed between the first media layer and the second waveguide substrate wherein, as the image light propagates along the first media layer via total internal reflection, the first layer is configured to block the image light from passing into the first waveguide substrate and the second layer is configured to block the image light from passing into the second waveguide substrate.

2. The optical waveguide of claim 1 wherein the second media layer is edge-coupled to the first media layer at an interface and wherein all the image light is configured to pass from the first media layer into the second media layer through the interface.

3. The optical waveguide of claim 2 wherein, as the image light propagates along the second media layer via total internal reflection, the image light is configured to pass into the second waveguide substrate.

4. The optical waveguide of claim 1 wherein the first layer overlaps the first media layer and wherein the first layer is non-overlapping with the second media layer.

5. The optical waveguide of claim 1 wherein the first and second layers are dielectric layers, or comprise optically clear adhesive, or comprise reflective coatings.

6. The optical waveguide of claim 1 wherein the first layer is in direct contact with the first media layer.

7. The optical waveguide of claim 1 wherein the first media layer has a first index of refraction, the second media layer has a bulk index of refraction that is different from the first index of refraction, the first layer has a second index of refraction that is less than the first index of refraction, and the second index of refraction is configured to block the image light from passing into the first waveguide substrate as the image light propagates along the first media layer via total internal reflection.

8. A display system configured to display image light at an eye box, the display system comprising:

first and second waveguide substrates;

first and second media layers interposed between the first and second waveguide substrates, wherein the second media layer is edge-coupled to the first media layer and wherein the first media layer has a first index of refraction;

a cross-coupler in the first media layer, wherein the first media layer is configured to propagate the image light via total internal reflection and the cross-coupler is configured to redirect the image light towards the second media layer as the image light propagates through the first media layer;

an output coupler in the second media layer and configured to couple the image light out of the second media layer and towards the eye box;

a first dielectric layer interposed between the first media layer and the first waveguide substrate, wherein the first dielectric layer is in direct contact with the first media layer and the first waveguide substrate; and a second dielectric layer interposed between the first media layer and the second waveguide substrate, wherein the first and second dielectric layers have a second index of refraction that is different from the first index of refraction.

9. The display system of claim 8 wherein the first media layer has a first lateral surface coupled to the first dielectric layer, the first media layer has a second lateral surface that opposes the first lateral surface and that is coupled to the second dielectric layer, and the first and second lateral surfaces are configured to reflect the image light as the image light propagates through the first media layer.

10. The display system of claim 9 wherein the second media layer is edge-coupled to the first media layer at an interface, wherein the second media layer is in direct contact with the first media layer at the interface, and wherein the image light passes from the first media layer into the second media layer through the interface.

11. The display system of claim 8 wherein the first and second dielectric layers comprise optically clear adhesive.

12. The display system of claim 8 wherein the first index of refraction is greater than or equal to 1.6 and the second index of refraction is less than or equal to 1.6.

13. The display system of claim 8 wherein the cross-coupler comprises a louvered mirror embedded in the first media layer.

14. The display system of claim 8 wherein the output coupler comprises volume holograms in the second media layer.

15. The display system of claim 8 wherein the second dielectric layer is in direct contact with the first media layer and the second waveguide substrate.

16. The display system of claim 14 wherein the second media layer has a bulk index of refraction that is less than the first index of refraction.

17. The display system of claim 8, further comprising:

an input coupling prism mounted to the first waveguide substrate and configured to couple the image light into the first media layer.

18. A display system configured to display image light at an eye box, the display system comprising:

first and second waveguide substrates;

first and second media layers interposed between the first and second waveguide substrates, wherein the second media layer is edge-coupled to the first media layer and wherein the first media layer has a first index of refraction;

a cross-coupler in the first media layer, wherein the first media layer is configured to propagate the image light via total internal reflection and the cross-coupler is configured to redirect the image light towards the second media layer as the image light propagates through the first media layer;

an output coupler in the second media layer and configured to couple the image light out of the second media layer and towards the eye box;

a first dielectric layer interposed between the first media layer and the first waveguide substrate, wherein the first dielectric layer is in direct contact with the first media layer; and a second dielectric layer interposed between the first media layer and the second waveguide substrate, wherein the second dielectric layer is in direct contact with the first media layer and the second waveguide substrate and wherein the first and second dielectric layers have a second index of refraction that is different from the first index of refraction.

* * * * *